(12) United States Patent
Adamec

(10) Patent No.: US 11,663,672 B2
(45) Date of Patent: May 30, 2023

(54) USER INTERFACE LOG VALIDATION VIA BLOCKCHAIN SYSTEM AND METHODS

(71) Applicant: NANTHEALTH, INC., Culver City, CA (US)

(72) Inventor: Andreas Adamec, Northridge, CA (US)

(73) Assignee: NANTHEALTH, INC., Culver City, CA (US)

( * ) Notice: Subject to any disclaimer, the term of this patent is extended or adjusted under 35 U.S.C. 154(b) by 415 days.

(21) Appl. No.: 16/957,645

(22) PCT Filed: Dec. 27, 2018

(86) PCT No.: PCT/US2018/067632
§ 371 (c)(1),
(2) Date: Jun. 24, 2020

(87) PCT Pub. No.: WO2019/133682
PCT Pub. Date: Jul. 4, 2019

(65) Prior Publication Data
US 2021/0042839 A1 Feb. 11, 2021

Related U.S. Application Data

(60) Provisional application No. 62/611,840, filed on Dec. 29, 2017.

(51) Int. Cl.
*H04L 9/32* (2006.01)
*H04L 9/06* (2006.01)
(Continued)

(52) U.S. Cl.
CPC ........... *G06Q 40/08* (2013.01); *H04L 9/0643* (2013.01); *H04L 9/3239* (2013.01); *H04L 9/50* (2022.05); *H04L 2209/88* (2013.01)

(58) Field of Classification Search
CPC ..... G06Q 40/08; H04L 9/0643; H04L 9/3239; H04L 9/50; H04L 2209/88
See application file for complete search history.

(56) References Cited

U.S. PATENT DOCUMENTS 9,182,967 B2 11/2015 Lu et al.
10,943,680 B1 * 3/2021 Knas .................... H04L 9/0861
(Continued)

FOREIGN PATENT DOCUMENTS

WO 2018037148 3/2018

OTHER PUBLICATIONS

Thomas, Shane, "International Search Report and Written Opinion," PCT/US2018/067632, dated Mar. 21, 2019, 7 pages, ISA/US, Alexandria, Virginia.

*Primary Examiner* — Noura Zoubair
(74) *Attorney, Agent, or Firm* — Stetina Brunda Garred and Brucker

(57) ABSTRACT

Disclosed are apparatus, systems, computer readable media, or methods wherein user interface user interactions may be electronically logged and stored based on various inputs and outputs of data from the user interface forming a digital chain of events and interactions (e.g., a blockchain). An interaction logging system is disclosed including a user tracking or logging engine configured to derive session data and user interface data storing the same into interaction tracking chains or blockchains. A validation blockchain may co-exist with a session blockchain that may be formed independently and include version data of user interface software acting as a secure verifiable history of the versions of the user interface. In a session block of the session blockchain, a pointer may be stored with the session data, wherein the pointer indicates a particular block on the
(Continued)

validation blockchain that may assist in the validation of information stored in the session blockchain.

22 Claims, 6 Drawing Sheets

(51) Int. Cl.
*G06Q 40/08* (2012.01)
*H04L 9/00* (2022.01)

(56) References Cited

U.S. PATENT DOCUMENTS

| | | |
|---|---|---|
| 2010/0229112 A1 | 9/2010 | Ergan et al. |
| 2013/0054272 A1 | 2/2013 | Rangadass et al. |
| 2013/0132833 A1 | 5/2013 | White et al. |
| 2014/0114675 A1 | 4/2014 | Soon-Shiong |
| 2015/0332283 A1 | 11/2015 | Witchey et al. |
| 2016/0105402 A1 | 4/2016 | Soon-Shiong et al. |
| 2017/0046651 A1 | 2/2017 | Lin et al. |
| 2017/0173262 A1 | 6/2017 | Veltz |
| 2017/0244757 A1 | 8/2017 | Castinado et al. |
| 2017/0257358 A1 | 9/2017 | Ebrahimi et al. |
| 2017/0289134 A1 | 10/2017 | Bradley et al. |
| 2018/0060496 A1 | 3/2018 | Bulleit et al. |
| 2018/0082043 A1 | 3/2018 | Witchey et al. |
| 2018/0114045 A1* | 4/2018 | Ebrahimi ............. G06K 7/1417 |
| 2018/0165588 A1 | 6/2018 | Saxena et al. |
| 2018/0255090 A1* | 9/2018 | Kozloski ............... H04L 67/535 |

* cited by examiner

USER INTERFACE LOG VALIDATION VIA BLOCKCHAIN SYSTEM AND METHODS

CROSS-REFERENCE TO RELATED APPLICATIONS

The present application claims priority to PCT International Application No. PCT/US2018/067632, filed Dec. 27, 2018, which claims priority to U.S. Provisional Patent Application No. 62/611,840, filed Dec. 29, 2017, the entirety of the disclosures of which are expressly incorporated herein by reference.

STATEMENT RE: FEDERALLY SPONSORED RESEARCH/DEVELOPMENT

Not Applicable

BACKGROUND

Field of the Invention

The field of the invention is digital session tracking and capturing technologies using blockchain.

Background

The background description includes information that may be useful in understanding the systems and methods described herein. It is not an admission that any of the information provided herein is prior art, or that any publication specifically or implicitly referenced is prior art.

Techniques of logging computer user sessions include those in which a user logs on to a network or computer system which records the identity of the user through a verification password or other authentication device such as an RFID or NFC card. In the simplest form, the system may note the time of system logon by the user, and the duration of the logon. More detailed systems may require the user to logon using biometric systems such as facial recognition and may require click through acknowledgements that a user had read key language appearing on the computer screen. In other systems, particularly web based systems, the system may track the user session by recording the URL or web page visited by the user, related metadata or screen dumps may be downloaded to record the user screen or data input by the user.

Systems of interest for logging user interactions with computer systems that include recording tools to capture sequences of user interactions in the context of graphical user interfaces include United States patent application publication No. 2010/0229112 published on Sep. 9, 2010 to Ergan et al., entitled Problem Reporting System Based on User Interaction, the substance of which is incorporated herein by reference. Also see United States patent application publication No. 2013/0132833 published May 23, 2013 to White et al., entitled Systems and Methods for Remote Tracking and Replay of User Interaction with a Webpage, the substance of which is incorporated herein by reference.

With the increased use of computer and on-line systems that allow healthcare providers to interact with healthcare systems including the review of patient data, diagnosis and instructions to patients, there is an increased interest in recording, validating and storing relevant data related to each user session. For example, it may be important to record reported patient symptoms, patient and provider insurance information, patient or event diagnosis, doctor instructions or other matter that may not necessarily be memorialized in the form of a written or document communication, but may have nevertheless have been encountered, communicated or observed in a user session with a computer system through a user interface. Such information may be important for one or more stakeholders in the healthcare environment for, among other things, improving patient care, lowering risk to patients, evaluating insurance claims or addressing liability issues to healthcare providers. In any recorded documented user sessions it may also be important to maintain patient privacy of any stored information. Advantageously, computer interactions with networks and systems could be tracked, documented and verified using more reliable techniques than conventional systems that merely rely on data download such as web-page snapshots, metadata or screen dumps and conventional storage of information. Thus, there remains a need for systems or methods through which system interactions can be tracked, stored and verified in a reliable manner.

The evolution of techniques for storing secure information through implementation of blockchain technology has gained interest outside the area of distributed financial ledgers used in cryptocurrencies. Blockchain techniques include openchain (www.openchain.org) and Ethereum, which deploy distributed ledger platforms based on open source. Such blockchain approaches may include the secure managing of data outside of the area and application of cryptocurrency. Implementation of standard blockchain techniques may require significant computing resources and require dedicated equipment. Microsoft's Confidential Consortium (CoCo) has emerged in development stages to attempt to improve blockchain system speed and privacy of stored data. Also, Intel has attempted a distributed ledger platform known as Sawtooth Lake (see URL intelledger-.github.io/0.7/introduction.html) using transaction families with specialized language. Sawtooth Lake may eliminate the need for dedicated equipment and early indications appear to point toward the process as being scalable for large numbers.

Blockchain systems are widely used with regard to financial data for secure and reliable storage of transaction information, as is disclosed in United States patent publication No. 2017/0244757 published Aug. 24, 2017 to Castinado et al., entitled System for External Validation of Secure Process Transactions, the substance of which is incorporated herein by reference. Healthcare transaction validation systems and methods deploying blockchain are presented in United States patent publication No. 2015/0332283 published Nov. 19, 2015 to Witchey, entitled Healthcare Transaction Validation Via Blockchain proof-of-work systems and methods, the substance of which is incorporated herewith. Blockchain systems may also be used in storage of medically related data as disclosed in U.S. Patent Application Publication No. 2018/0082043 published Mar. 22, 2018 (also filed as PCT/US17/52284 on Sep. 19, 2017) entitled Sample Tracking Via Sample Tracking Chains, Systems and Methods incorporated herein by reference.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

BRIEF SUMMARY

The subject matter described herein provides apparatus, systems, computer readable media, or methods in which system user interface that may include web-page interactions can be electronically logged and stored based on various inputs and outputs of data from the user interface to form a digital chain of events and interactions (e.g., a blockchain, etc.). As used herein, chain and blockchain may be used interchangeably. One aspect of the subject matter described herein includes an interaction logging system that includes a user tracking engine or user logging engine. The tracking or logging engine is configured to derive session data and user interface data and to store the same into interaction tracking chains or blockchains. The interaction tracking chain, which may be referred to as a session blockchain, in typical embodiments, includes a linked blockchain of digital information, possibly forming an audit trail, where each link in the chain represents one or more user interactions through a user interface with a computer system, data indicative of a patient healthcare state, etc. A validation blockchain may co-exists with a session blockchain. The session blockchain logs and stores the session data, while the validation blockchain formed independently may include version data of the user interface software that includes the particular version of the user interface along with definitions describing the version. In this regard, the validation blockchain acts as a secure verifiable running history of the versions of the user interface software including version content. In a session block of the session blockchain, a pointer may be stored along with the session data, wherein the pointer points to a particular block on the validation blockchain. The session block pointer to the validation blockchain may assist in the validation of the information stored in the session blockchain.

The interaction tracking engine is operable with at least one processor and computer readable, non-transitory memory storing software instructions. Upon execution of the software instructions by the processor, the interaction tracking engine is configurable to process one or more aspects of the interaction. In some embodiments, the interaction tracking chain comprises a blockchain that can be considered a user-specific audit trail. The user tracking engine also is able to update the interaction tracking chain in the interaction database so that the user tracking chain includes the current up to date audit trail of interactions.

Various objects, features, aspects and advantages of the subject matter described herein will become more apparent from the following detailed description of preferred embodiments, along with the accompanying drawing figures in which like numerals represent like components.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It should be noted that any language herein directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute a computer program product comprising software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP/IP, UPD/IP, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It is understood that the use of "configured to" or "programmed to" (or similar language) should not be construed to invoke interpretation under 35 USC 112(f).

One should appreciate that the disclosed techniques provide many advantageous technical effects including providing verifiable information related to human or machine interaction with computer networks or websites and in particular a user interface. Accordingly, the present techniques provide a way in which to greatly improve the validity of data, and in particular, data corresponding interactions with computer systems including user interface software.

Figure 1:
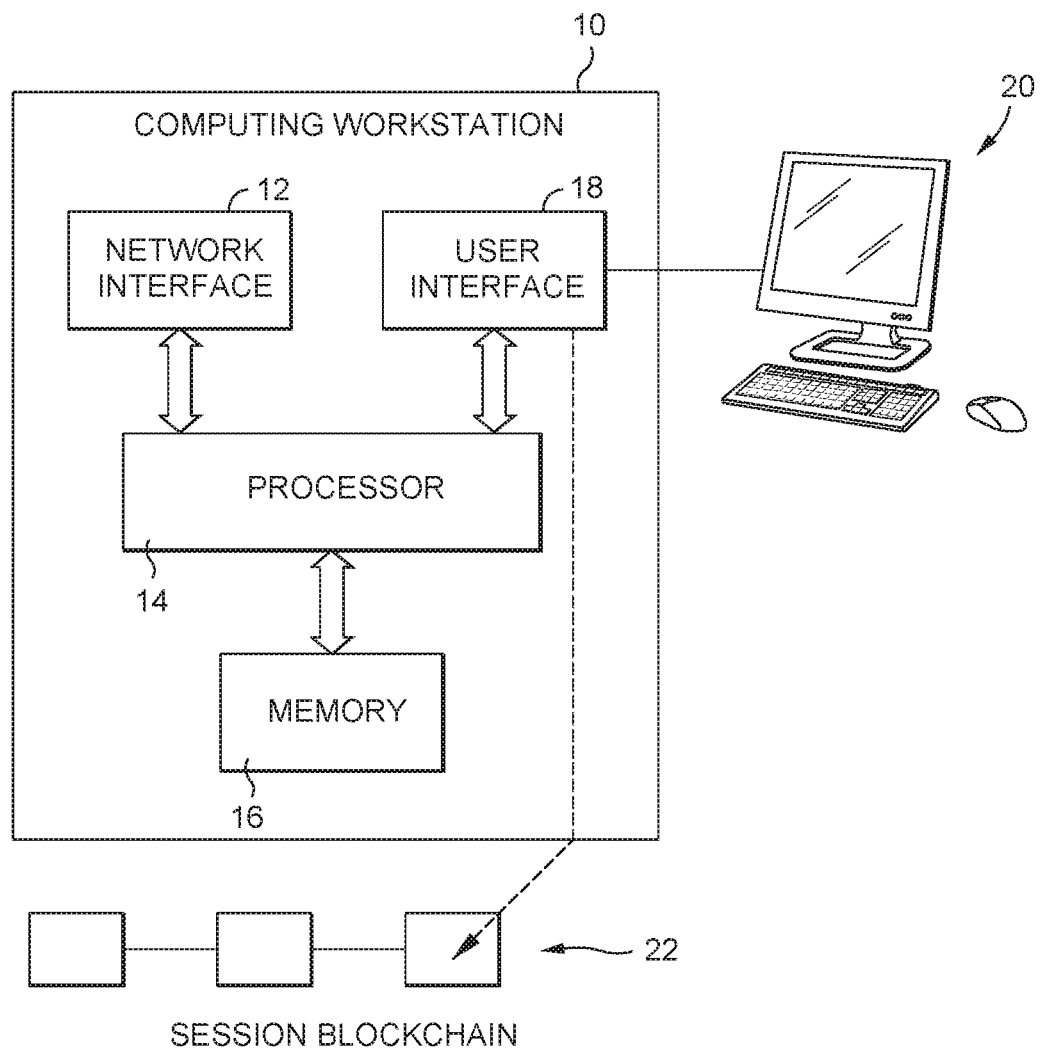
FIG. 1 is a conceptual block diagram of a system disclosed herein for user interface logging and validation using blockchain.

Referring to FIG. 1, there is shown a conceptual block diagram of a computing workstation 10 that is used as a healthcare system client. The computing workstation 10 provides a user, such as a medical practitioner, with access to a healthcare system in a computer network environment. Non-limiting types of data that can be accessed and viewed in a healthcare environment through a computer workstation and user interface are described in United States Patent Application Publication No. 2013/0054272 published Feb. 28, 2013 to Rangadass et al., entitled System and Method for a Healthcare Monitoring Framework in a Network Environment, the substance of which is incorporated herein by reference. The computing workstation 10 may include a network interface 12, a processor 14 and a memory 16. The processor 14 is adapted to run applications, software and widgets on the workstation 10 and to access data via the network interface 12 to enable a health practitioner to interface with a healthcare system through the user interface 18, including healthcare network systems such as clinical decision support platforms (e.g. NantHealth's Eviti® Connect), healthcare payer-provider portals (e.g. NantHealth's NaviNet Open), etc.

A user interface 18 may include a software user interface that interacts with a plurality of peripheral devices 20, each designed to provide interaction with the workstation and network and can include a graphical user interface (GUI). Peripherals 20 may include input and output devices such as a screen display, a mouse, a keyboard, camera, touch screen, microphone, RFID reader, NFC reader, joystick and other such devices. In addition to healthcare providers accessing a healthcare system, patients may also access such a healthcare system through a user interface 18 using peripheral devices 20. In addition to the various peripherals described above, patients may further interact with the workstation and healthcare network with medically related inputs into the system such as heart rate monitors, blood pressure monitors, glucose monitors, respiration monitors and other systems and sensors that can measure patient vitals.

Other more passive systems may be employed to interact with user interface 18 such as key logging software, eye gaze tracking through the use of a camera device, screen shot or screen dump software, GPS locator, WiFi locator, metadata capture software, bio information tags, access control items such as RFID location cards and readers, cursor tracking software to identify where the cursor moved on the screen and where the user clicked, biometric sensors such as fingerprint peripherals, retinal scanners, image capturing devices coupled with face recognition software, etc., document signing pads, screen capture software, IP address trace route software for capturing the IP trace route and similar systems. By executing on processor 14 a tracking engine module, the disclosed system derives session data for recording or storage purposes. In some cases, it may be advantageous to capture and store, as close as technically possible, the user experience through the user interface 18 during a particular session. The derived session data is then stored in a session blockchain 22. In each instance, or in instances where it is desired, when a user initiates a session at a computer workstation through a user interface 18, the session data along with content data and version identifier data of the user interface is logged and deposited in a session block chain 22. Session data can include the user interaction with the user interface 18, such as, but not limited to, data transmitted on a display screen, screen shots, key strokes, mouse cursor movement, items selected, metadata associated with display pages and related data. Session data can further include patient medical data collected from external monitors and sensors, user-validating and/or presence-indicative data collected from biometric sensors and other systems, and additional data collected from healthcare network systems such as clinical decision support platforms and healthcare payer-provider portals.

Content data can include a definition of user interface application software elements such as, menu data, window data, pane data, tab data, icon data, pointer data, font size, color data, cursor data, and widget data. Version data can include software provider identification or version number for the user interface application software.

All or a portion of the data described above can be stored in a blockchain for a particular user of the system. The session data can be stored in session blockchain 22, however, the disclosure contemplates several existing session blockchains. Consider for example that a doctor user will have an individual session blockchain to keep a running record of user interface sessions each time the doctor logs into the healthcare network. Likewise, a healthcare institution, such as a hospital, may have its own session blockchain for each doctor and nurse that logs into the healthcare system. Further sessions blockchains may exist for all persons interacting with the system such as patients, insurance personnel, accounting persons and others. In such examples, a single session may be recorded in several session block chains. For example, in the case of a doctor initiated session, the session may be recorded in one or more of the following: doctor blockchain, the hospital for which the doctor works blockchain, the doctor's medical group blockchain, the paying carrier blockchain or a patient blockchain. As is known with blockchain storage, the data stored in a block of the blockchain includes a hash reference to the data in the immediately preceding block in the chain, providing secure storage of the data. The data in the blockchain 22 may be encrypted or otherwise safeguarded for privacy in accordance with HIPPA regulations.

In view that the blocks of the blockchain can include patient information, the data can be secured via one or more cryptographic techniques (e.g., 3DES, AES, ECC, etc.). For example, the private data stored in the blocks of the session blockchain 130 can be encrypted based on a patient's private key. Upon authorization from the patient, or other authorized agent, a stakeholder can be permitted to access the data based on patient's key possibly using existing key exchange techniques. Further, access to private data within a session block of the session blockchain can occur via establishing one or more secure sessions within a homomorphic environment as discussed in U.S. patent application publication U.S. 2016/0105402 to Soon-Shiong et al. titled "Homomorphic Encryption in a Healthcare Network Environment, Systems and Methods", filed Jul. 21, 2015, incorporated herein by reference. Also, session blocks of the session blockchain 130 can be referenced by or point to health object identifiers (HOI) associated with a patient. HOIs are discussed in more detail in U.S. patent application publication 2014/0114675 to Soon-Shiong titled "Healthcare Management Objects," filed Jan. 3, 2014, incorporated herein by reference.

Figure 2:
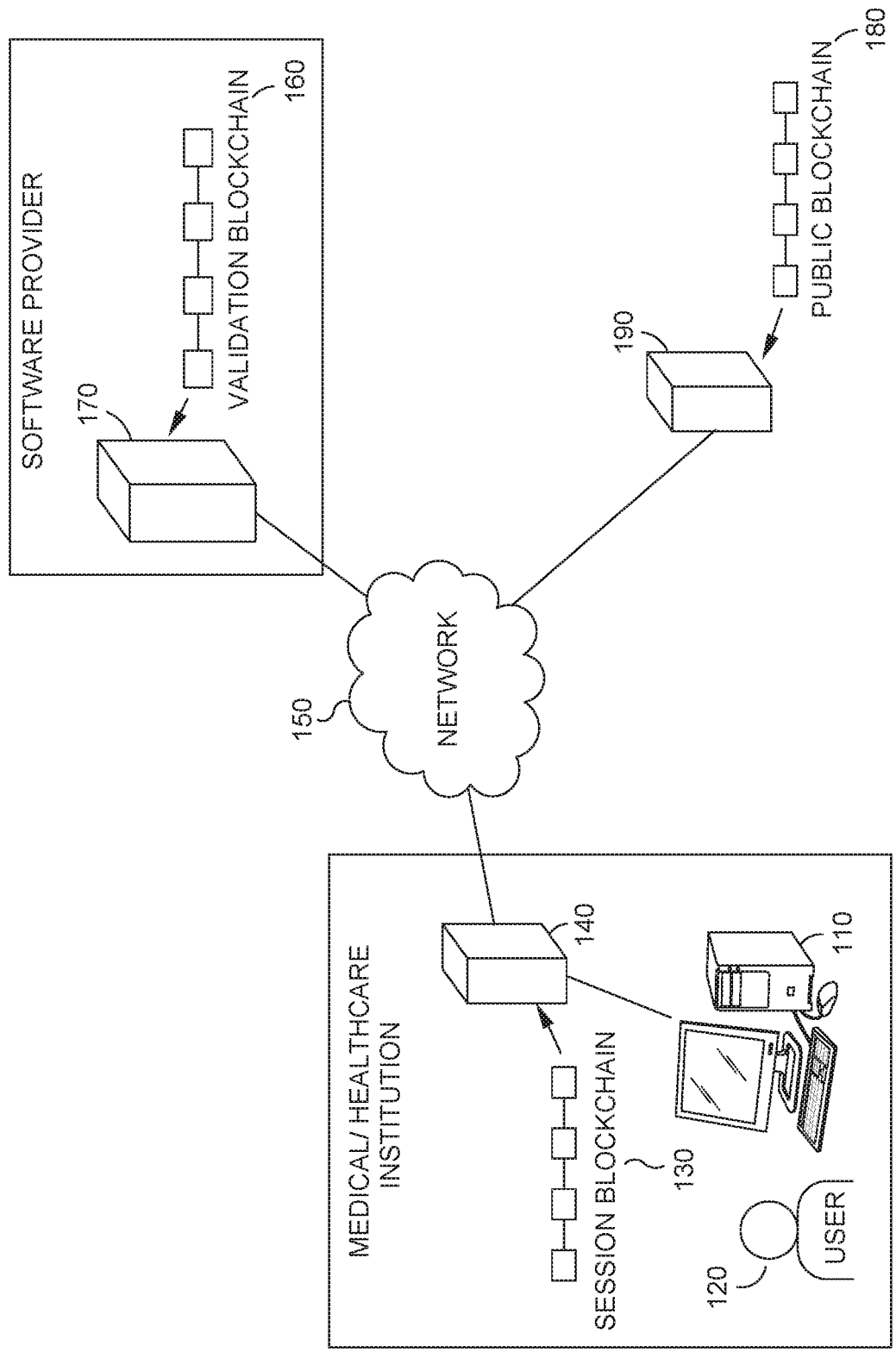
FIG. 2 is a block diagram of system components disclosed herein for user interface logging and validation using blockchain.

Referring to FIG. 2, a computing workstation 110 is shown in the context of a use environment according to an aspect of the disclosed subject matter. An example of the computing workstation 110 may be the computing workstation 10 described in relation to FIG. 1 and having a network interface 12, processor, 14, memory 16, and user interface 18 as well as a plurality of peripheral devices 20, by which a user 120 (e.g. a healthcare provider) may interact with the user interface 18. In the example of FIG. 2, the session data from a user interface session of the user 120 is stored in a session blockchain 130 located on one or more servers 140. The session blockchain 130 may be distributed among a plurality of servers 140 as is known in the art. In the example environment shown in FIG. 2, the servers 140 are controlled by or otherwise associated with a medical or healthcare institution.

The session blockchain 130 may be specific to a particular healthcare provider, a particular patient, or the entire medical/healthcare institution or any subdivision thereof. As such, there may be a plurality of session blockchains 130 on the one or more servers 140. As the user 120 engages with a user interface of a software application running on the computing workstation 110 (e.g. a medical or healthcare software application), the computing workstation 110 derives session data and user interface data from the user interface session and stores the derived data in a session block of the session blockchain 130. A single session block may contain the entirety of the derived data from the user interface session or only a portion of such data, e.g. an individual user interaction or group of user interactions. A user interface can include any user interface software application, including those in the healthcare field. For example a doctor's computer workstation, lap top, tablet or smartphone will have user interface software that allows the doctor to interact with a healthcare network. Also, remote patient computers, lap top, tablet or smartphone user interface applications may interact with a healthcare network. Also consider patient step through application user interface that is filled out at a doctor's office prior to treatment. Also, user interfaces can include software applications that execute electronic document signing. Consider user interfaces that execute cell phone contracts, or on screen signing for credit card purchases at point of purchase.

Assuming, for the sake of example, that each individual block contains the data of a whole user interface session, the block may be created when the session ends. As described in more detail below, the block may contain, in addition to the derived session data and user interface data, a pointer to a block of a validation blockchain 160 and a timestamp derived from a most recent block of a public blockchain 180 such as a BitCoin blockchain. To this end, the one or more servers 140 storing the session blockchain 130 may be connected, via a network 150 (e.g. the Internet), to one or more servers 170 storing a validation blockchain 160 and one or more servers 190 storing a public blockchain 180. Like the server(s) 140, the server(s) 170 and server(s) 190 may store the validation blockchain 160 and public blockchain 180 in a distributed fashion as is known in the art. In the example use environment of FIG. 2, the validation blockchain 160 and server(s) 170 are controlled by or otherwise associated with a software provider of the software application that has the user interface. As such, the validation blockchain 160 may be stored remotely from the session blockchain 140, e.g. in a different geographic location, on a different network, under the control of a different entity, etc. As will be described in more detail below, such validation blockchain 160 of the software provider may be referred to when validating data stored in the session blockchain 130.

Figure 3:
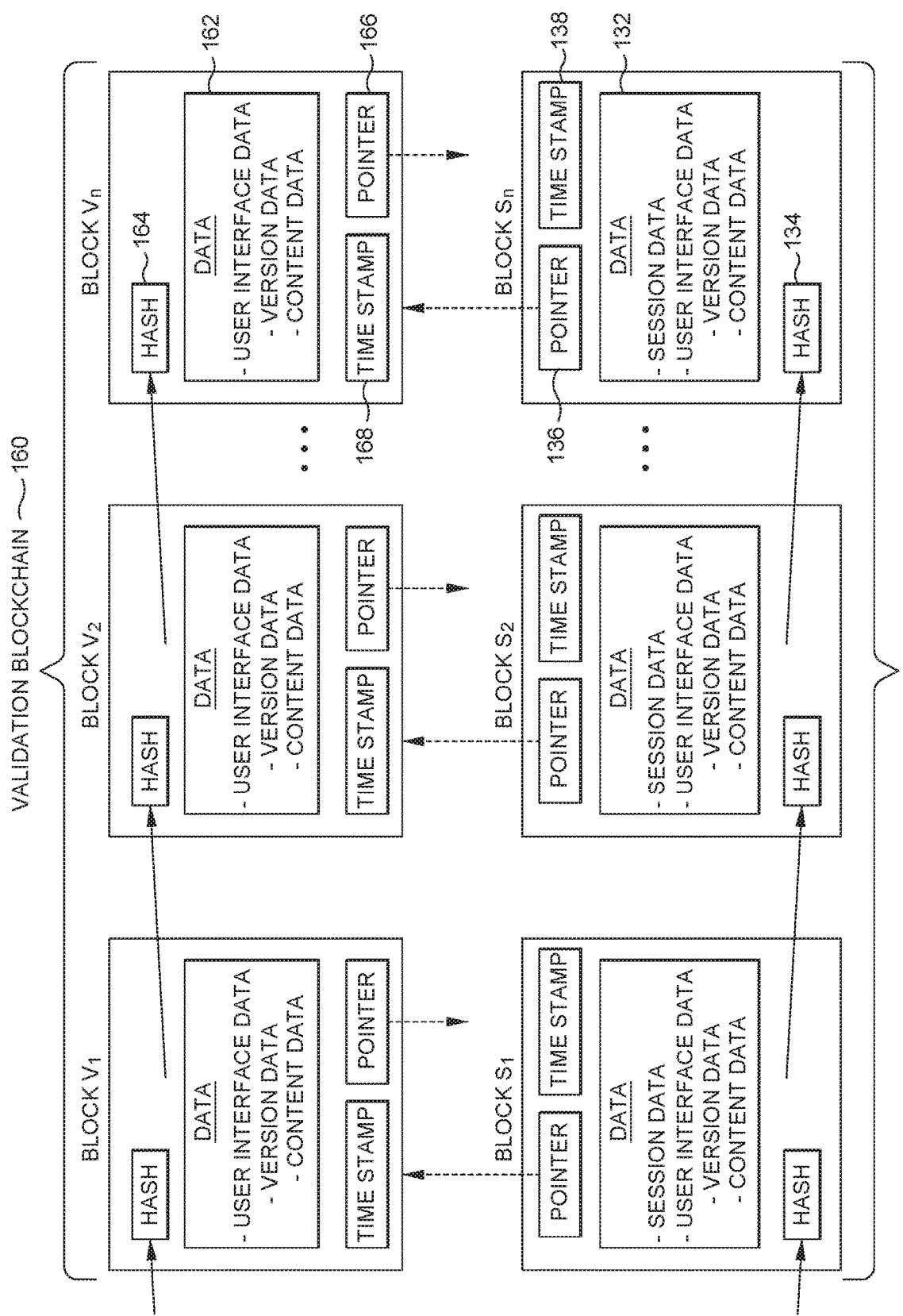
FIG. 3 are block diagrams of examples of validation blockchains and session blockchains of the system and techniques disclosed herein.

FIG. 3 shows a detailed view of an example session blockchain 130 and validation blockchain 160. As shown in the lower half of FIG. 3, the session blockchain 130 may contain a number of blocks S1, S2, . . . Sn, while the validation blockchain 160 may contain a number of blocks V1, V2, . . . Vn. The indices 1, 2, etc. associated with the blocks are not intended to convey any absolute meaning, and it is assumed that prior blocks may exist in each chain that are not depicted in FIG. 3. Along the same lines, blocks Sn and Vn are only intended to represent the latest blocks of the respective blockchains 130, 160 (e.g. "n" may be thought of as "new"), without implying that the blockchains 130, 160 necessarily have the same number of blocks.

Continuing the example of the use environment of FIG. 2, the session block Sn of the blockchain 130 may include data 132 in the form of the derived session data and user interface data from the recently completed user interface session. As described above, the user interface data may include, for example, user interface version data (e.g. a software version number) and user interface content data. The session block Sn may further include a hash 134 of the previous block in the session blockchain 130 as is known in the art. The hash 134 may be a hash of the entire previous block or a portion thereof, e.g. a header portion.

The session block Sn may further include a pointer 136 to a validation block Vn of the validation blockchain 160. As noted above, the validation blockchain 160 may be associated with the provider of the software application that has the user interface. More specifically, the software provider may store a version evolution of the user interface in the validation blockchain 160. As such, the validation block Vn may store data 162 in the form of user interface data, for example, user interface version data (e.g. a software version number) and user interface content data, that represents an authoritative definition of the user interface at a particular stage of the user interface's evolution or at a particular point in time. Being the most recent block in the validation blockchain 160, the validation block Vn may, for example, define the most recent version of the user interface. In cases where the software provider may provide different versions to different customers or classes of customers, different validation blockchains 160 may be associated with each customer or class of customer. In this way, the validation blockchain 160 may be implemented in a way that the most recent validation block Vn is authoritative with respect to a given medical/healthcare institution or other customer. For example, the user interface data 162 of the most recent validation block Vn may represent the user interface that was sold to the customer, offered to the customer, or available to the customer, or the user interface that the customer was obligated (e.g. contractually, by regulation, etc.) to install without modification. By pointing to the most recent validation block Vn, the pointer 136 of the newly created session block Sn may thus provide a link between the recorded/logged user interface data in the session block Sn and corresponding reference user interface data in the validation block Vn. The pointer 136 may, for example, be a function of a block ID of the validation block Vn.

The session block Sn may further include a time stamp 138 of a most recent block of a public blockchain 180, e.g. a hash of the most recent block of the public blockchain 180. In this way, an indisputable time stamp may be associated with each block of the session blockchain 130. More generally, external data included in the time stamp 138, such as from the public blockchain 180, can include a hash digest from one or more external distributed, public ledgers (e.g., BitCoin, LiteCoin, Ethereum, etc.). In some cases, a timestamp associated with a transaction or interaction may become corrupt or inaccurate. According to certain aspects, external data from a public ledger, e.g., a hash digest associated with BitCoin, can be used as a notary, providing an independent measure of the validity of the timestamp associated with the sample state object. The public ledger data or hash digest acts as an external timestamp that is independent of the session blockchain 130 with respect to a particular point of time or a time thereafter. Thus, using the public ledger provides an independent validation that the data from the corresponding block has not been tampered with or modified.

In addition to the data 162, the validation block Vn may further include a hash 134 of the previous block in the validation blockchain 160 as is known in the art, which may be a hash of the entire previous block or a portion thereof, e.g. a header portion. The validation block Vn may also include a time stamp 168 of a most recent block of a public blockchain 180, e.g. a hash of the most recent block of the public blockchain 180 or other external data as described above in relation to the time stamp 138. The validation block Vn may further include a pointer 166 to a session block of the session blockchain 130, which may be a function of a block ID of the session block. In the example of FIG. 3, the pointer 166 is depicted as indicating the session blockchain 130 generally for simplicity. As a specific example, the pointer 166 may point to the newest session block at the time the validation block Vn is created and the session block associated with the last session that used an older version of the interface than the version associated with Vn, which would be a record of the last use of an older interface version.

The approach of building blockchains such as session blockchain 130 and validation blockchain 160 can be considered as building a blockchain similar to those typically used in many cryptocurrencies, BitCoin for example. However, there are notable differences. Cryptocurrencies typically require peer computing devices, referred to as miners, to provide proof-of-work or proof-of-stake in order to combine blocks into the blockchain, which can incur computing resources and time delay. The disclosed approach is not dependent on the peer structure. The chains 130 and 160, for example, may be single stand-alone chains representing sessions of a user on a user interface or software versions. Further, the user tracking engine or logging engine may execute a session block linking function to the remainder of the chain without requiring cryptographic calculations (e.g., proof of work, a hash digest with a specific signature, etc.). In other embodiments, the session blockchain can be part of a larger blockchain infrastructure, e.g., as part of a hyper ledger or other blockchain based infrastructure, or integrated into other existing sample tracking chains or blockchains. Examples of storing healthcare data in a large blockchain to create a healthcare historical blockchain (HHBC) may be found in United States patent publication No. 2015/0332283 published Nov. 19, 2015 to Witchey, entitled Healthcare Transaction Validation Via Blockchain proof-of-work systems and methods, the substance of which is incorporated herein by reference.

When auditing data in a particular session block of the session blockchain, the validation blockchain 160 may be used to validate the data in various ways. For example, it may turn out that the pointer 136 of the audited session block points to a validation block having different version data (e.g. a different version number) from the version data contained in the audited session block. This may indicate that the user of the user interface (e.g. the healthcare provider) had an incorrect version installed at the time of the logged user interaction. As another example, it may turn out that the validation block has the same version data but different content data. This may indicate that installed software was somehow modified at the user's end and was not exactly the same as what the software provider had provided at the time of the logged user interaction.

Figure 4:
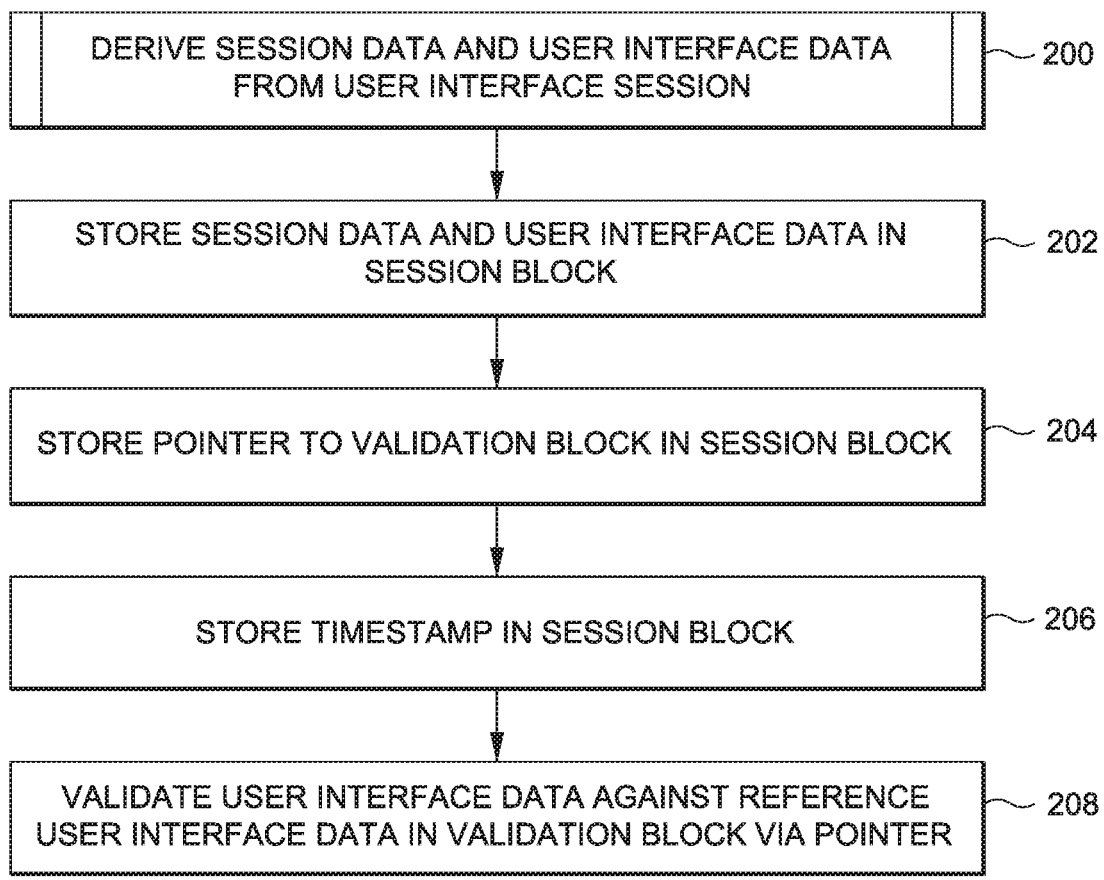
FIG. 4 is a flowchart of the steps of a method disclosed herein for storing session data into a blockchain and related validation of data.

Referring particularly to FIG. 4, there is shown a flow diagram of the steps of the process executed by the user tracking engine or the logging engine described herein. In step 200 the user tracking engine or logging engine derives session data which comprises the dynamic interaction of the session by the user. For example, the session data may include keystrokes, mouse cursor location, screenshots of data shown on the screen, signature pads for accepting signatures, and other similar interaction. In other words, the session data would attempt to duplicate or capture, as much as technically possible, the user's experience with the user interface software during the session. Consider that it may important to establish what a user was viewing during a particular session or in a time frame, such as data displayed, images shown ore even the size of the font. In addition, in step 200, the user tracking or logging engine derives user interface data from the session. The user interface data can comprise content data, such as the structure of the software and the software capability and elements, along with user interface version data. Version data can include software developer information identifying the particular version of the software. In step 202 the derived data is stored on a session block of a session blockchain. In this regard, a block in the blockchain is constructed in accordance with known blockchain platforms, wherein a hash is formed with the stored data as a function of data stored in the immediately preceding session block of the session blockchain.

In step 204 the user tracking engine stores a pointer to a validation block in a validation blockchain that corresponds to the user interface software. The validation blockchain would typically be created by the software provider of the software user interface. At step 206, the user tracking engine also stores in the session block of the session blockchain a timestamp to validate the time of the captured session. In step 208, the user tracking engine may validate user interface data against reference user interface data in the validation block via the stored pointer. In this regard, the user tracking engine may compare the user interface data stored in the session block to the user interface reference data stored in the validation block of the validation blockchain in order to validate the information contained in the corresponding session block of the session blockchain.

Figure 5:
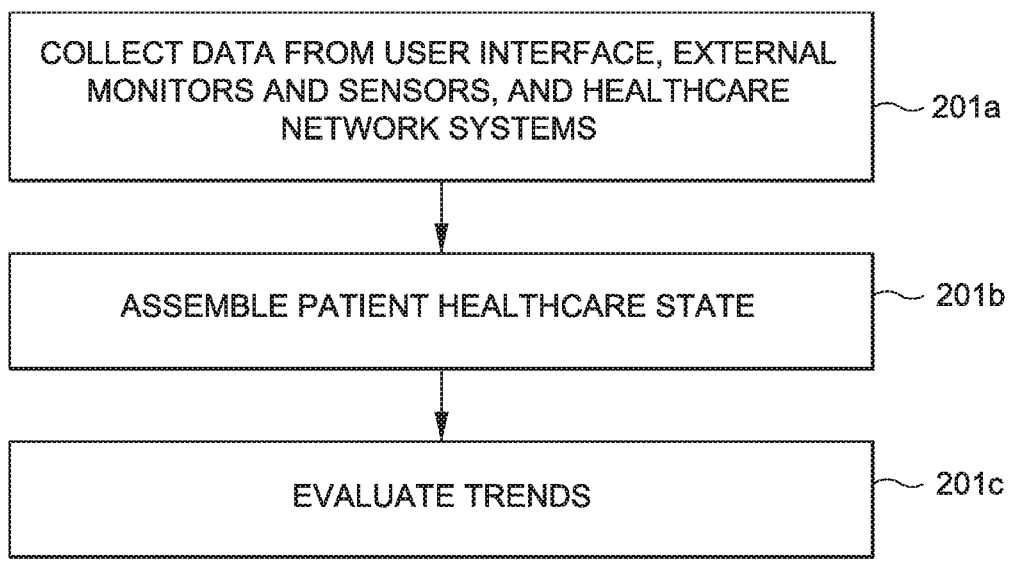
FIG. 5 is a flowchart of example sub-steps of step 200 of FIG. 4.

FIG. 5 is a flowchart of example sub-steps of step 200 of FIG. 4, in particular, sub-steps of deriving the session data. As noted above, the session data may include, in addition to data of the user's interaction with the user interface 18, patient medical data collected from external monitors and sensors, user-validating and/or presence-indicative data collected from biometric sensors and other systems, and additional data collected from healthcare network systems such as clinical decision support platforms and healthcare payer-provider portals. Such data may be collected, along with the data form the user interface 18, in step 201*a*.

Of particular note, the collected data to be used in deriving the session data may include medically related data such as contemporaneously captured patient data from heart rate monitors, blood pressure monitors, glucose monitors, respiration monitors and other systems and sensors that can measure patient vitals, as well as medically related data collected (e.g. via network interface 12) from healthcare network systems (e.g. Eviti® Connect, NaviNet Open) such as medical record data associated with the patient, family medical history, diagnosis information of the patient, medical history of the patient, information exchange with medical providers and insurance payers. Some or all of such collected data may be used to assemble, as part of the session data, a patient healthcare state at step 201*b*. The patient healthcare state may be a vector or other data object indicative of a current healthcare state of the patient at time of the session and may include, for example, contemporaneously measured patient vitals, a snapshot of the patient's medical record/history, a recorded dialogue or other interaction with a doctor or other healthcare provider, etc., all of which may subsequently be stored in the blockchain as session data in association with the user's interaction with the user interface 18. Also included in the scope of session data is patient biometric data (e.g. a fingerprint taken on a smartphone) or other user-validating or presence-indicative data (e.g. smartphone GPS data, WiFi or Bluetooth connectivity data), by which the session data to be stored in the blockchain may be self-validating to reliably identify the user with which it is associated.

As further represented by step 201c in FIG. 5, deriving the session data to be stored in the blockchain may further include the evaluation of various trends and other meta information about the session data. For example, changes in the patient healthcare state over multiple time-stamped sessions may be indicative of disease progression, drug/treatment effectiveness, or other observable time-dependent relationships. Such trends etc. may be evaluated and themselves included in the session data associated with the session. For example, when referencing the previous block to calculate a hash 134 as described above, the session data of the previous block may be combined with the current patient healthcare state and/or other session data of the current session to determine a trend of interest, such as a difference between a current medical sensor measurement and a previous medical sensor measurement (with further reference to the time stamps 138 of the two sessions). Trends that are not time-related are also contemplated, such as correlations between medical data of a patient and the patient's family medical history. It should also be noted that such trends may in some cases not be stored in the blockchain but may be evaluated after the fact with reference to multiple blocks of the blockchain representative of multiple sessions of interest.

Figure 6:
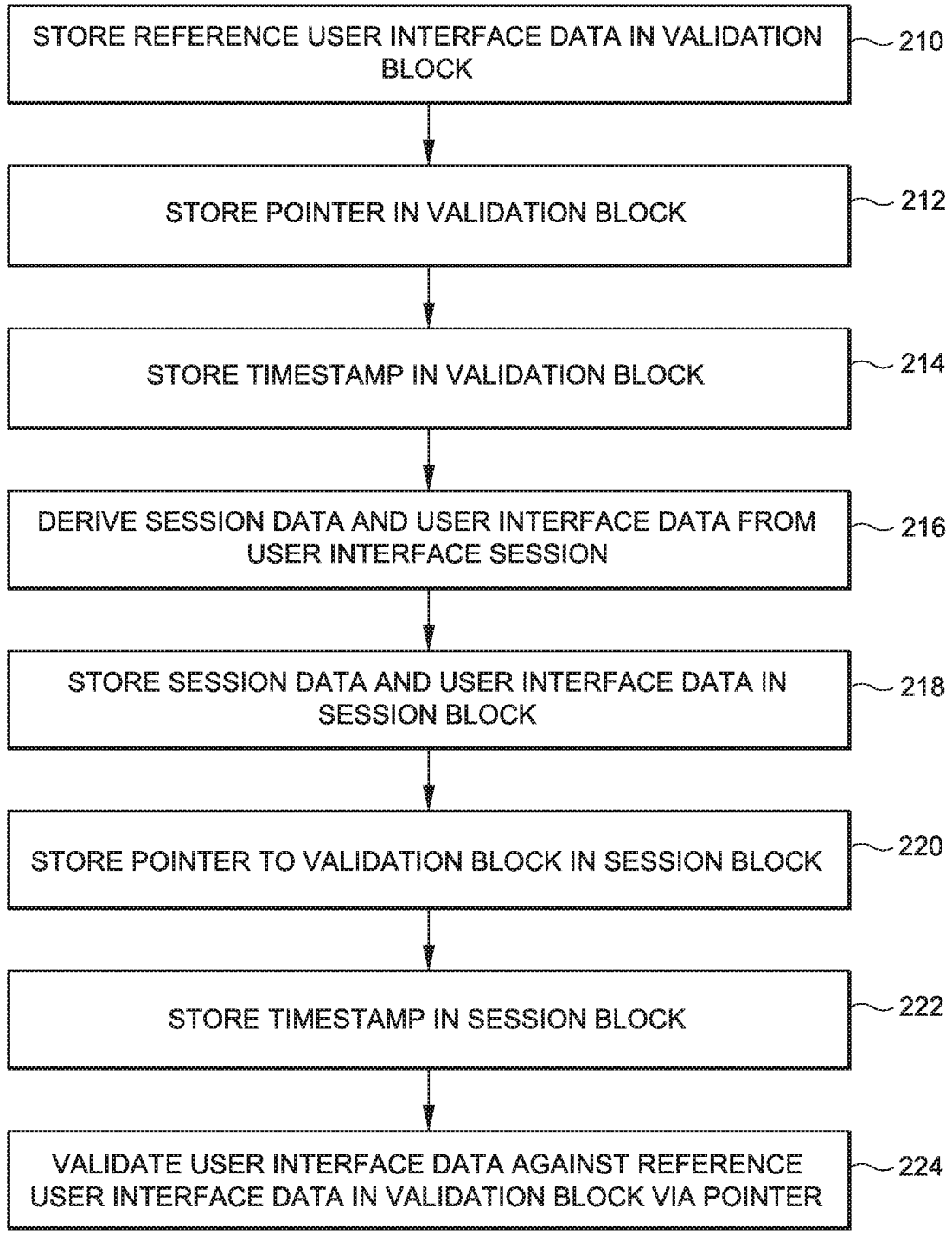
FIG. 6 is a flowchart of the steps of a method disclosed herein for storing session data into a blockchain and related validation of data.

Referring to FIG. 6, there is shown a flow diagram with steps 210-214 demonstrating steps completed in accordance with the holder of the validation blockchain. In step 210, the validation blockchain holder creates a validation block in the validation blockchain by storing reference user interface data. The reference user interface data may include information about the capabilities, functions and elements of the user interface software application along with information about the version number of the software. In this regard, a validation block in the validation blockchain is constructed in accordance with known blockchain platforms, wherein a hash is formed with the stored data as a function of data stored in the immediately preceding block of the validation blockchain. A pointer is stored in the validation block at step 212 that may point to a particular session block in the session blockchain assuming that there has been a session started already. In the instance where no session has been started, a pointer may not be stored in the validation block. At step 214 a timestamp is stored in a validation block of the validation blockchain to validate the time of the stored information or creation of the validation block. Steps 216-224 are executed by the user tracking engine in identical steps to steps 200-208 described above and may, for example, include sub-steps 201a-201c of FIG. 5 in step 216.

The focus of the disclosed subject matter described herein is to enable construction or configuration of a computing device to operate on vast quantities of digital data in the form of human or machine interaction through network interfaces such as websites, beyond the capabilities of a human. Although the digital data represents verifiable interaction information, it should be appreciated that the digital data is a representation of one or more interactions, and not the interaction itself. By instantiation of such verifiable digital information from interaction in the memory of the computing device(s), in this case block chain transactions, the computing device(s) are able to manage the digital data or models in a manner that provide utility to a user of the computing device that the user would lack without such a tool.

The above discussion provides many example embodiments of the subject matter described herein. Although each embodiment represents a single combination of inventive elements, the subject matter described herein is considered to include all possible combinations of the disclosed elements. Thus if one embodiment comprises elements A, B, and C, and a second embodiment comprises elements B and D, then the subject matter described herein is also considered to include other remaining combinations of A, B, C, or D, even if not explicitly disclosed.

As used herein, and unless the context dictates otherwise, the term "coupled to" is intended to include both direct coupling (in which two elements that are informationally coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the subject matter described herein are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the subject matter described herein are approximations, the numerical values set forth in the specific examples are reported as precisely as practicable. The numerical values presented in some embodiments of the subject matter described herein may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the subject matter described herein and does not pose a limitation on the scope of the subject matter described herein otherwise claimed. No language in the specification should be construed as indicating any non-claimed element essential to the practice of the subject matter described herein.

Groupings of alternative elements or embodiments of the subject matter described herein disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for tracking user interactions with a user interface, comprising:
   at least one processor;
   at least one non-transitory computer readable memory for storing software instructions executable by said at least one processor; and
   a user tracking engine executable on said at least one processor according to the stored software instructions to perform operations comprising:
      deriving session data and user interface data from a user interface session of a user interface of a software application, the session data including user-validating data associated with a user of the user interface, medical record data associated with a patient, and patient medical data collected, contemporaneously with the user interface session, from one or more patient monitors associated with the patient, the user interface data including user interface version data of the user interface;
      storing the session data and the user interface data in a session block of a session blockchain;
      storing, in the session block, a pointer to a validation block of a validation blockchain, the validation block storing reference user data of the user interface, the reference user interface data including reference user interface version data of the user interface;
      validating data stored in the session blockchain using the validation blockchain, said validating including comparing the user interface version data stored in the session block of the session blockchain with the reference user interface version data stored in the validation block to which the pointer in the session block points; and
      auditing the user interface session based on said validating, said auditing including determining whether an incorrect version of the user interface was installed at a time the user interface session occurred.

2. The system of claim 1, wherein the session data includes one or more elements selected from the group consisting of: time data, date data, diagnosis data, patient state information, trends, screenshot data, stakeholder data, care provider data, image data, geo-location data, biometric data, address data, insurance data, workstation data, key log data, peripheral screen positioning data, and eye tracking data.

3. The system of claim 1, wherein the user interface data includes and user interface content data of the user interface.

4. The system of claim 3, wherein the user interface content data includes one or more elements selected from the group consisting of: menu data, window data, pane data, tab data, icon data, pointer data, font size, color data, cursor data, and widget data.

5. The system of claim 1, wherein the operations further comprise storing, in the session block, a timestamp derived from a most recent block of a public blockchain.

6. The system of claim 5, wherein the timestamp is derived from a hash of the most recent block of the public blockchain.

7. The system of claim 1, wherein the validation block stores a timestamp of a most recent block of a public blockchain.

8. The system of claim 7, wherein the timestamp is derived from a hash of the most recent block of the public blockchain.

9. The system of claim 1, wherein the pointer is a function of a block ID of the validation block.

10. The system of claim 1, wherein the validation block is a most recent block of the validation blockchain.

11. The system of claim 1, wherein the validation block stores a pointer to a session block of the session blockchain.

12. The system of claim 11, wherein the pointer stored in the validation block is a function of a block ID of a session block of the session blockchain.

13. The system of claim 1, wherein the validation blockchain is stored remotely from the session blockchain.

14. The system of claim 1, wherein
   the user interface data stored in the session block includes user interface content data of the user interface, and
   the reference user interface data includes reference user interface content data defined by the reference user interface version data.

15. The system of claim 14, wherein the user interface content data stored in the session block and the reference user interface content data each include one or more elements selected from the group consisting of: menu data, window data, pane data, tab data, icon data, pointer data, cursor data, and widget data.

16. The system of claim 14, wherein the pointer stored in the validation block is a function of a block ID of the session block.

17. The system of claim 1, wherein the software application is a medical or healthcare software application.

18. The system of claim 1, wherein the session data includes insurance data, and said validating includes validating the insurance data stored in the session blockchain using the validation blockchain.

19. The system of claim 1, wherein the session blockchain is an insurance carrier blockchain, and said validating includes validating the data stored in the insurance carrier blockchain.

20. The system of claim 1, wherein the validation blockchain contains insurance data used by an insurance carrier.

21. A method comprising:
   deriving session data and user interface data from a user interface session of a user interface of a software application, the session data including user-validating data associated with a user of the user interface, medical record data associated with a patient, and patient medical data collected, contemporaneously with the user interface session, from one or more patient monitors associated with the patient, the user interface data including user interface ye rs ion data of the user interface ;

storing the session data and the user interface data in a session block of a session blockchain;

storing, in the session block, a pointer to a validation block of a validation blockchain, the validation block storing reference user data of the user interface , the reference user interface data including reference user interface vers ion data of the user interface;

validating data stored in the session blockchain using the validation blockchain, said validating including comparing the user interface vers ion data stored in the session block of the session blockchain with the reference user interface version data stored in the validation block to which the pointer in the session block points; and auditing the user interface session based on said validating, said auditing including determining whether an incorrect version of the user interface was installed at a time the user interface session occurred.

22. A non-transitory computer readable medium on which are stored program instructions executable by a processor to perform operations comprising:

deriving session data and user interface data from a user interface session of a user interface of a software application, the session data including user-validating data associated with a user of the user interface, medical record data associated with a patient, and patient medical data collected, contemporaneously with the user interface session, from one or more patient monitors associated with the patient, the user interface data including user interface vers ion data of the user interface ;

storing the session data and the user interface data in a session block of a session blockchain;

storing, in the session block, a pointer to a validation block of a validation blockchain, the validation block storing reference user data of the user interface, the reference user interface data including reference user interface version data of the user interface;

validating data stored in the session blockchain using the validation blockchain, said validating including comparing the user interface vers ion data stored in the session block of the session blockchain with the reference user interface version data stored in the validation block to which the pointer in the session block points; and auditing the user interface session based on said validating, said auditing including determining whether an incorrect version of the user interface was installed at a time the user interface session occurred.

\* \* \* \* \*